(12) United States Patent
Ohgishi et al.

(10) Patent No.: US 8,677,244 B2
(45) Date of Patent: Mar. 18, 2014

(54) EXCLUSIVE OPERATION CONTROL APPARATUS AND METHOD

(75) Inventors: Kiyoshi Ohgishi, Kyoto (JP); Satoshi Inami, Osaka (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 12/745,321

(22) PCT Filed: Sep. 25, 2009

(86) PCT No.: PCT/JP2009/004865
§ 371 (c)(1),
(2), (4) Date: May 28, 2010

(87) PCT Pub. No.: WO2010/035476
PCT Pub. Date: Apr. 1, 2010

(65) Prior Publication Data
US 2011/0167352 A1    Jul. 7, 2011

(30) Foreign Application Priority Data

Sep. 29, 2008  (JP) .................................. 2008-250116

(51) Int. Cl.
*G06F 3/00* (2006.01)
(52) U.S. Cl.
USPC ............ 715/733; 715/811; 423/345; 239/589
(58) Field of Classification Search
None
See application file for complete search history.

(56) References Cited

U.S. PATENT DOCUMENTS

| 6,187,279 | B1 * | 2/2001 | Tanino et al. ................. | 423/345 |
| 8,297,540 | B1 * | 10/2012 | Vijay ............................. | 239/589 |
| 2005/0183035 | A1 * | 8/2005 | Ringel et al. .................. | 715/811 |

FOREIGN PATENT DOCUMENTS

| JP | 6-187279 | 7/1994 |
| JP | 8-297540 | 11/1996 |
| JP | 9-190398 | 7/1997 |
| JP | 2001-101015 | 4/2001 |
| JP | 2005-196740 | 7/2005 |
| JP | 2006-31359 | 2/2006 |
| JP | 2006-92573 | 4/2006 |

OTHER PUBLICATIONS

International Search Report issued Dec. 8, 2009 in corresponding International Application No. PCT/JP2009/004865.

* cited by examiner

*Primary Examiner* — Boris Pesin
*Assistant Examiner* — Ayesha Huertas Torres
(74) *Attorney, Agent, or Firm* — Wenderoth, Lind & Ponack, L.L.P.

(57) ABSTRACT

Provided is an exclusive operation control apparatus which, when input operations of a plurality of users compete with each other, displays a content on which the plurality of input operations are reflected, instead of performing only one of the input operations. An operation determination section receives input information from the plurality of users, and determines an operation. An exclusive operation determination section determines an exclusive operation concerning a new operation by using the new operation and a previous operation. The content copying section copies the content based on a result of the determination. The content management section receives the new operation from the operation determination section and, when the new operation is an operation on the copied content, generates and displays on a display device display data which is obtained by reflecting the new operation on the copied content.

8 Claims, 12 Drawing Sheets

FIG. 2A

| EXCLUSIVE OPERATION INFORMATION TABLE | | | | | | |
|---|---|---|---|---|---|---|
| No | PREVIOUS OPERATION | NEW OPERATION | OPERATOR | ELAPSED TIME | STATE | PROCESS |
| 1 |  | ... | SAME | ... | ... | CONTINUE |
| 2 | RETURN | RETURN | DIFFERENT | LESS THAN ONE SECOND | ... | IGNORE |
| 3 | RETURN | RETURN | DIFFERENT | NOT LESS THAN ONE SECOND | ... | CONTINUE |
| 4 | RETURN | SCROLL-UP | DIFFERENT | LESS THAN ONE SECOND | SCROLL-UP IS NOT ALLOWED | COPY |
| 5 | RETURN | SCROLL-UP | DIFFERENT | LESS THAN ONE SECOND | SCROLL-UP IS ALLOWED | CONTINUE |
| 6 | RETURN | SCROLL-UP | DIFFERENT | NOT LESS THAN ONE SECOND | ... | CONTINUE |
| 7 | CHARACTER INPUT | SCROLL-DOWN | DIFFERENT | ... | SCROLL-DOWN CAUSES FORM TO BE OUT OF SCREEN | COPY |
| 8 | CHARACTER INPUT | SCROLL-DOWN | DIFFERENT | ... | SCROLL-DOWN CAUSES FORM TO BE INSIDE SCREEN | CONTINUE |
| ⋮ | ⋮ | ⋮ | ⋮ | ⋮ | ⋮ | ⋮ |

FIG. 2B

| EXCLUSIVE OPERATION INFORMATION TABLE | | | | | | |
|---|---|---|---|---|---|---|
| No | PREVIOUS OPERATION | NEW OPERATION | OPERATOR | ELAPSED TIME | STATE | PROCESS |
| 1 | ... | RELEASE SELECTION | ... | ... | ... | CONTINUE |
| 2 | ... | ... | SAME | ... | ... | CONTINUE |
| 3 | ... | RETURN | DIFFERENT | ... | ... | COPY |
| ⋮ | ⋮ | ⋮ | ⋮ | ⋮ | ⋮ | ⋮ |

FIG. 2C

| EXCLUSIVE OPERATION INFORMATION TABLE |||||||
|---|---|---|---|---|---|---|
| No | PREVIOUS OPERATION | NEW OPERATION | OPERATOR | ELAPSED TIME | STATE | PROCESS |
| 1 | ⋯ | PAUSE | ⋯ | ⋯ | ⋯ | CONTINUE |
| 2 | ⋯ | ⋯ | SAME | ⋯ | ⋯ | CONTINUE |
| 3 | ⋯ | RETURN | DIFFERENT | ⋯ | ⋯ | COPY |
| ⋮ | ⋮ | ⋮ | ⋮ | ⋮ | ⋮ | ⋮ |

FIG. 3

| OPERATION STATE TABLE ||||
|---|---|---|---|
| OPERATION TIME | OPERATOR | OPERATION | STATE INFORMATION |
| ⋮ | ⋮ | ⋮ | ⋮ |
| 100.0 | A | RETURN | ⋯ |
| 100.5 | B | RETURN | ⋯ |
| ⋮ | ⋮ | ⋮ | ⋮ |
| 210.0 | B | RETURN | SCROLL-UP IS NOT ALLOWED |
| 210.5 | A | SCROLL-UP | |
| ⋮ | ⋮ | ⋮ | ⋮ |
| 300.0 | A | CHARACTER INPUT | SCROLL-DOWN CAUSES FORM TO BE OUT OF SCREEN |
| 301.0 | B | SCROLL-DOWN | |
| ⋮ | ⋮ | ⋮ | ⋮ |
| 400.0 | B | RANGE SELECTION | ⋯ |
| 401.0 | A | RETURN | ⋯ |
| ⋮ | ⋮ | ⋮ | ⋮ |
| 500.0 | A | PLAYBACK | ⋯ |
| 500.5 | B | RETURN | ⋯ |
| ⋮ | ⋮ | ⋮ | ⋮ |
| | | | |

F I G. 4
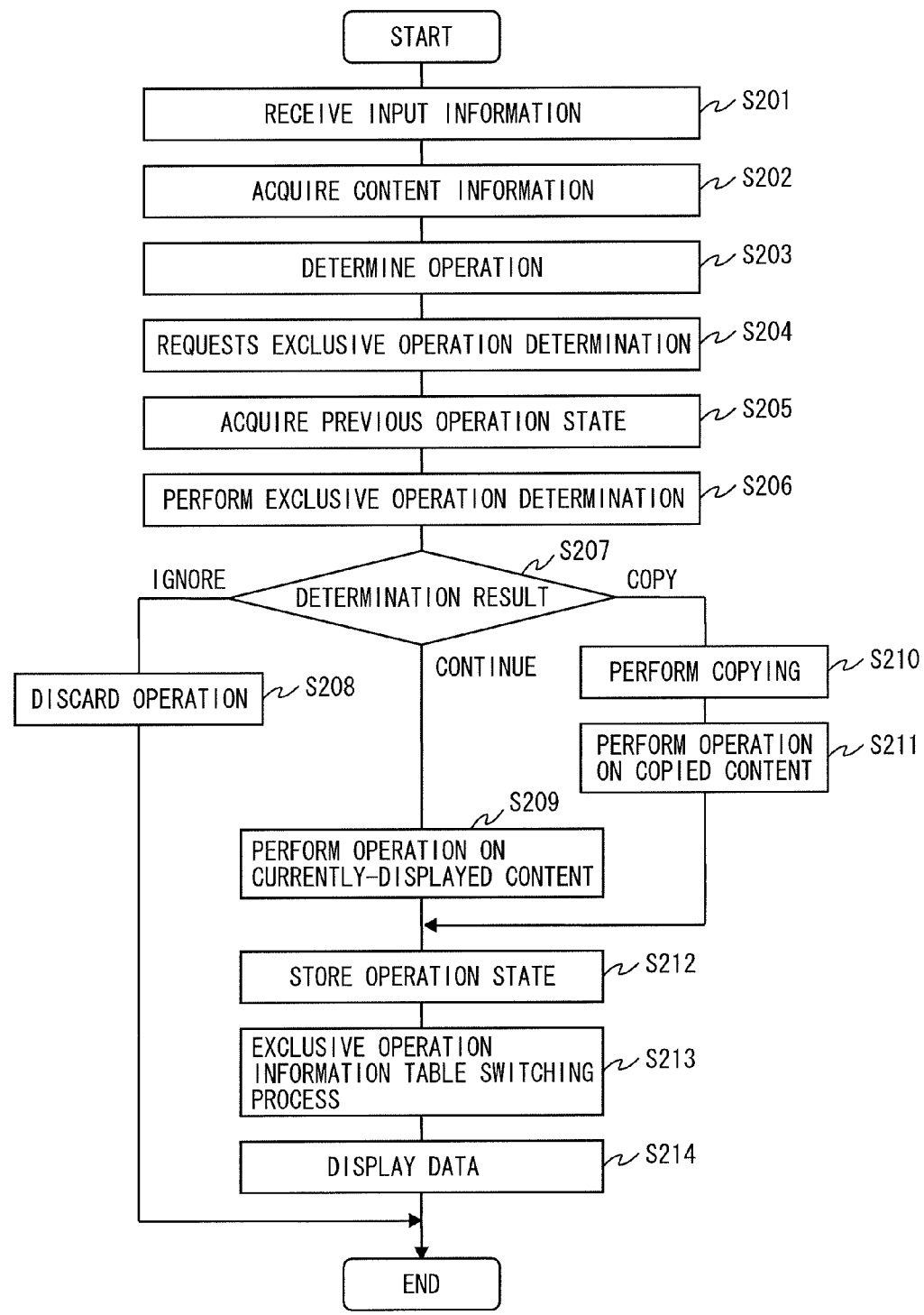

F I G. 9 A
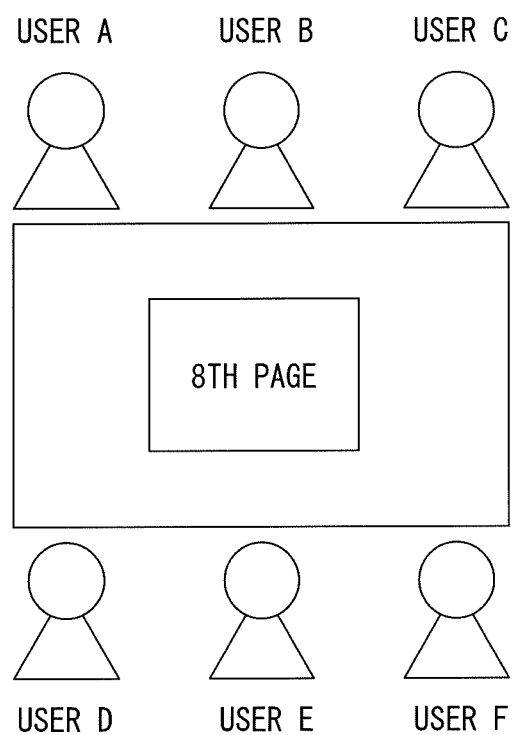

F I G. 9 B
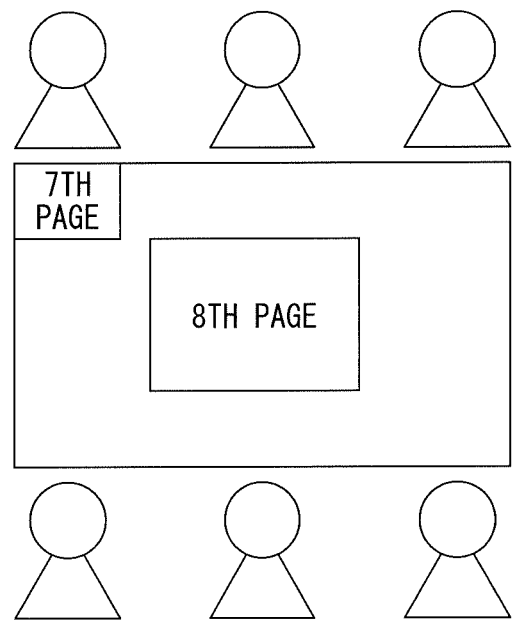

EXCLUSIVE OPERATION CONTROL APPARATUS AND METHOD

TECHNICAL FIELD

The present invention relates to an exclusive operation control apparatus provided in an information processing apparatus which displays a content, and more particularly relates to an exclusive operation control apparatus which receives input operations on the same contents from a plurality of users and controls an exclusive operation.

BACKGROUND ART

By a plurality of users simultaneously operating one information processing apparatus, a cooperative work on the same content is performed. The information processing apparatus to be operated includes a plurality of input devices for example, and receives an input signal from each input device and performs a process in accordance with the input signal. That is, the plurality of users can simultaneously perform an input operation by using the different input devices, respectively.

Among conventional information processing apparatuses which allow a plurality of users to simultaneously perform input operations, there is an information processing apparatus to which a plurality of mice are connected and in which mouse pointers having predetermined colors depending on the corresponding mice are displayed on a display screen so that the plurality of users can identify which mouse causes an operation (for example, see Patent Literature 1). In this manner, the conventional information processing apparatus can reflect and display input operations inputted from the plurality of mice on one display screen.

CITATION LIST

Patent Literature
Patent Literature 1: Japanese Laid-Open Patent Publication No. 8-297540

SUMMARY OF INVENTION

Technical Problem

However, in the conventional information processing apparatus, when a plurality of users use different mice, respectively, input operations inputted from the plurality of mice compete with each other due to an interrupt process. That is, when one user performs a leftward movement operation and another user performs a rightward movement operation before the leftward movement operation is reflected on the screen, the leftward movement operation is cancelled, and a result of only the rightward movement operation being performed is displayed on the screen. In this manner, the conventional information processing apparatus involves a problem that, when input operations performed by a plurality of users compete with each other, a result of only one of the input operations being performed is displayed on the screen.

Therefore, for solving the conventional problem, an object of the present invention is to provide an exclusive operation control apparatus which, when input operations performed by a plurality of users compete with each other, controls an exclusive operation of the input operations and displays a screen on which the plurality of input, operations are reflected, instead of performing only one of the input operations.

Solution to Problem

The present invention is directed to an exclusive operation control apparatus which receives input operations on a content displayed on a display device from a plurality of users and controls an exclusive operation. To achieve the above object, the exclusive operation control apparatus of the present invention includes: an operation determination section that receives input information from the plurality of users, and determines an operation based on the input information; an exclusive operation determination section that determines an exclusive operation concerning a new operation by using the new operation determined by the operation determination section and a previous operation; a content copying section that copies the content based on a result of the determination performed by the exclusive operation determination section; and a content management section that receives the new operation from the operation determination section and, when the new operation is an operation on the copied content, generates and displays on the display device display data which is obtained by reflecting the new operation on the copied content. The exclusive operation determination section includes: an exclusive operation information storage section that stores therein exclusive operation information which defines a relation among the new operation, the previous operation, and a need to copy the content; an operation state management section that manages an operation determined by the operation determination section; an operation state storage section that stores therein the operation managed by the operation state management section; and a determination control section that: receives the new operation from the operation determination section; acquires the previous operation from the operation state management section; determines an exclusive operation concerning the received new operation by using the exclusive operation information stored in the exclusive operation information storage section; and determines whether or not the content is to be copied.

Preferably, the exclusive operation information storage section stores therein the exclusive operation information as a plurality of exclusive operation information tables. The content management section determines whether or not the exclusive operation information table is to be switched based on a change of a state of the content on which the new operation is reflected and, when the content management section determines that the exclusive operation information table is to be switched, notifies the exclusive operation determination section of a content change notification. When the determination control section receives the content change notification from the content management section, the determination control section switches the exclusive operation information table to be used.

Preferably, the determination control section determines which action is to be performed for the new operation received from the operation determination section, copying the content and displaying a copy on the display device, continuing a process without copying the content, or ignoring the new operation on the content.

Preferably, when the determination control section determines to continue a process without copying the content, the content management section generates and displays on the display device display data obtained by reflecting the new operation in the content that is before the copying.

Preferably, the exclusive operation control apparatus further includes an input position storage section that in advance stores therein input positions of the plurality of users. In this case, when the content is to be copied and displayed on the display device, the content management section can display the copied content in a region near the input position of the user having inputted the new operation.

The present invention is also directed to a method performed by an exclusive operation control apparatus which receives input operations on a content displayed on a display device from a plurality of users and controls an exclusive operation. To achieve the above object, the method of the present invention includes: an operation determination step of receiving input information from the plurality of users, and determining an operation based on the input information; an exclusive operation determination step of determining an exclusive operation concerning a new operation by using the new operation determined in the operation determination step and a previous operation; a content copying step of copying the content based on a result of the determination performed in the exclusive operation determination step; and a content management step of receiving the new operation from the operation determination step and, when the new operation is an operation on the copied content, generating and displaying on the display device display data which is obtained by reflecting the new operation on the copied content. The exclusive operation determination step includes: an operation state management step of managing the operation determined in the operation determination step; and a determination control step of: receiving the new operation from the operation determination step; acquiring the previous operation from the operation state management step; determining an exclusive operation concerning the received new operation by using exclusive operation information which is stored in advance in the exclusive operation control apparatus and which defines a relation among the new operation, the previous operation, and a need to copy the content; and determining whether or not the content is to be copied.

The present invention is also directed to a program for performing the above-described method, and an integrated circuit for use in the above-described exclusive operation control apparatus.

Advantageous Effects of Invention

In the exclusive operation control apparatus of the present invention, when operations performed by a plurality of users compete with each other during a cooperative work, which one of copying a content, displaying a content as it currently is without copying the content, or ignoring an input operation performed by the user is desirable, can be determined. When it is determined that copying of a content is necessary, the content can be automatically copied and displayed without the user performing a copying operation. Therefore, even when operations performed by a plurality of users compete with each other, a content is automatically copied and displayed, and thereby contents in which the operations performed by the plurality of users are reflected can be simultaneously displayed without any influence on an operation performed in the cooperative work.

BRIEF DESCRIPTION OF DRAWINGS

FIG. 2A shows an example of an exclusive operation information table for a normal operation, which is stored in an exclusive operation information storage section 153 according to the embodiment of the present invention.

FIG. 2B shows an example of an exclusive operation information table for a range selection, which is stored in the exclusive operation information storage section 153 according to the embodiment of the present invention.

FIG. 2C shows an example of an exclusive operation information table for a playback of a video content, which is stored in the exclusive operation information storage section 153 according to the embodiment of the present invention.

FIG. 3 shows an example of an operation state, which is stored in an operation state storage section according to the embodiment of the present invention.

FIG. 4 is a flowchart showing an exemplary operation of an exclusive operation control apparatus 100 according to the embodiment of the present invention.

FIG. 9A shows an example of an imaginary picture showing that a plurality of users perform a cooperative work using the information processing apparatus 10 including the exclusive operation control apparatus 100.

FIG. 9B shows an example of an imaginary picture showing that a plurality of users perform a cooperative work using the information processing apparatus 10 including the exclusive operation control apparatus 100.

FIG. 10A is a block diagram showing an exemplary configuration of an information processing apparatus 10a including an exclusive operation control apparatus 100a.

DESCRIPTION OF EMBODIMENTS

Hereinafter, an embodiment of the present invention will be described with reference to the drawings.

Figure 1:
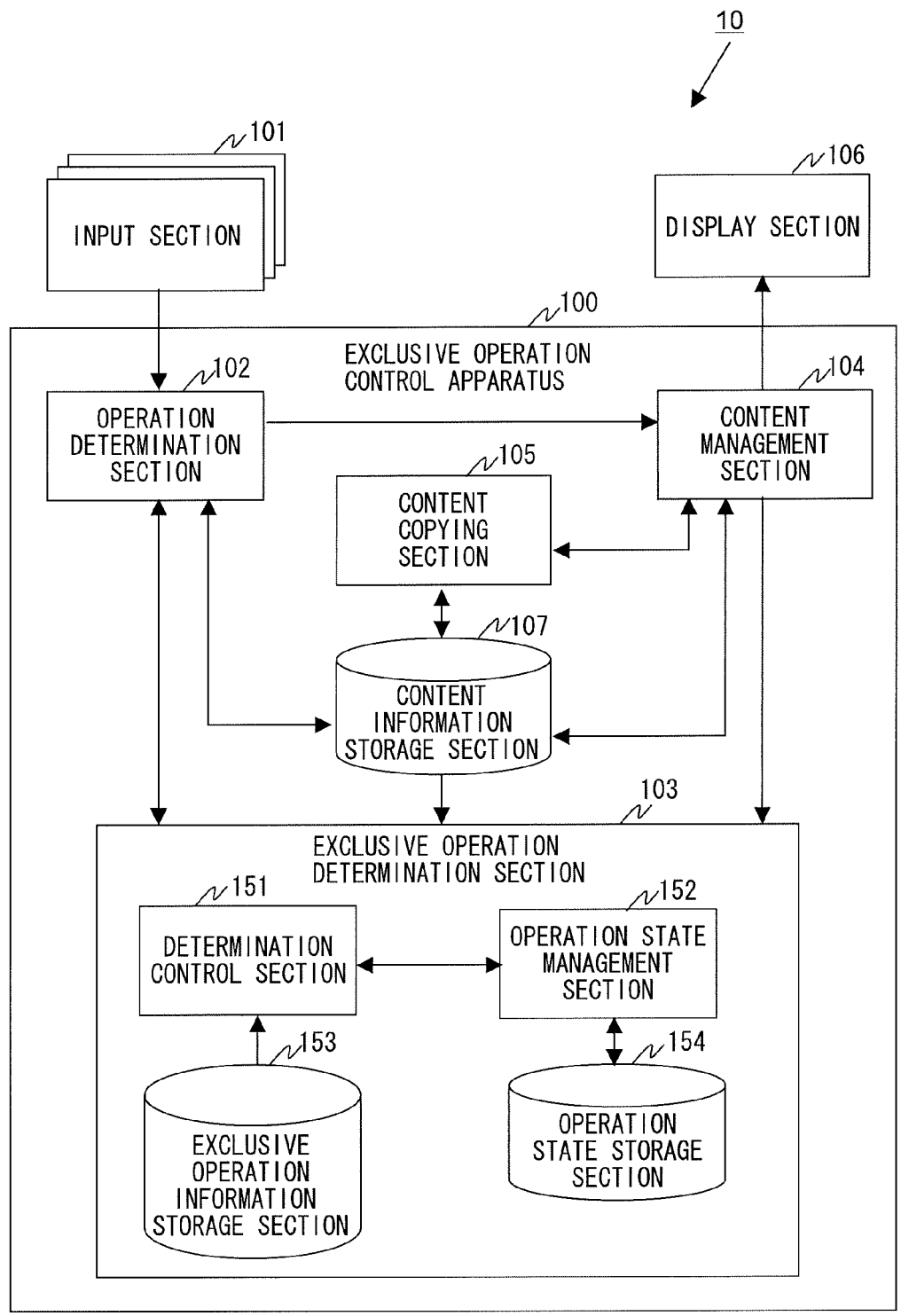
FIG. 1 is a block diagram showing an exemplary configuration of an information processing apparatus 10 according to an embodiment of the present invention.

FIG. 1 is a block diagram showing an exemplary configuration of an information processing apparatus 10 according to an embodiment of the present invention. In FIG. 1, the information processing apparatus 10 includes an exclusive operation control apparatus 100, an input section 101, and a display section 106. The exclusive operation control apparatus 100 includes an operation determination section 102, an exclusive operation determination section 103, a content management section 104, a content copying section 105, and a content information storage section 107.

The information processing apparatus 10 is an apparatus which displays a content, and has a web browser function for example. A content displayed by the web browser function is a content including an image, a moving image, a document, and the like. For example, the content is described using a markup language such as HTML. Also, a history of addresses of sites viewed by means of the web browser function, and the like, may be processed as a kind of contents.

In the above, the case where the exclusive operation control apparatus 100 is applied when the information processing apparatus 10 has the web browser function, has been mentioned as an example. However, the exclusive operation control apparatus 100 is applicable also when the information processing apparatus 10 has other functions. For example, the exclusive operation control apparatus 100 can be applied also when the information processing apparatus 10 has a text creation function, an image editing function, a text image editing function, and the like. When the information processing apparatus 10 has the document creation function, the information processing apparatus 10 can display text data as a content and perform a document creation operation. When the information processing apparatus 10 has the image editing function, the information processing apparatus 10 can display image data such as GIF data and JPEG data as a content and perform an image editing operation. When the information processing apparatus 10 has the text image editing function, the information processing apparatus 10 can display various data such as text data, GIF data, JPEG data, and MPEG data, and perform an editing operation.

In the following, an operation of the exclusive operation control apparatus 100, in a case where the exclusive operation control apparatus 100 is applied to the information processing apparatus 10 having the web browser function, will be specifically described.

Referring to FIG. 1, the input section 101 is an input device such as a touch panel, a keyboard, or a mouse. The input section 101 may be an input device that is connected to a network by means of IrDA, Bluetooth (registered trademark), a wireless LAN, or the like. Here, it is assumed that a plurality of input devices are connected, in order that a plurality of users can simultaneously perform a cooperative operation on the same content. The input section 101 receives an instruction from the user as an input operation from the outside, and notifies the exclusive operation control apparatus 100 of input information corresponding to the received input operation.

The input information may include user information based on which the user (that is, an operator) having operated the input section 101 can be identified. Alternatively, the input information may include input identification information indicating the input section 101 through which the input operation has been performed, so that the user having operated the input section 101 can be identified by using the input identification information. Hereinafter, a description will be given on the assumption that the input information includes the user information.

Also, the exclusive operation control apparatus 100 may preliminarily set a correspondence between the input section 101 and the user who operates the input section 101, and identify the user having performed the operation based on the correspondence. Additionally, the exclusive operation control apparatus 100 may receive, as the user information, an identification code assigned to each user at the time of an input operation, and identify the user having performed the operation based on the identification code. This enables a plurality of input sections 101 to be assigned to one user. This also enables a plurality of users to perform input operations by using one input section 101. In this case, a plurality of input sections 101 can correspond to one user.

The display section 106 is a display device such as a liquid crystal display, a CRT, and a plasma display. The display section 106 is an output device which displays a content. Thus, the display section 106 may also be called a display device. The display section 106 receives a notification of display data from the exclusive operation control apparatus 100, and outputs the received display data, thereby displaying the content which is being subjected to the cooperative work.

The exclusive operation control apparatus 100 includes the operation determination section 102, the exclusive operation determination section 103, the content management section 104, the content copying section 105, and the content information storage section 107. The exclusive operation determination section 103 includes a determination control section 151, an operation state management section 152, an exclusive operation information storage section 153, and an operation state storage section 154. It is not always necessary that the exclusive operation control apparatus 100 has the content information storage section 107 built therein, but the exclusive operation control apparatus 100 may refer to the content information storage section 107 that is externally connected to the exclusive operation control apparatus 100.

The operation determination section 102 receives the input information from the input section 101. The operation determination section 102 acquires, from the content information storage section 107, content information representing a currently displayed content on which a cooperative operation is to be performed. The operation determination section 102 interprets an instruction of a user based on the received input information and the content information, and determines an operation. Since the information processing apparatus 10 has the web browser function, the determined operation concerns an operation on a currently displayed content, a movement of display data, or the like. Specifically, the operation includes a "scroll-up" operation, a "scroll-down" operation, a "character input" operation, a "return" operation, an "advance" operation, a "stop" operation, an "update" operation, a "link selection" operation, and the like. The "character input" operation includes a key code of a character to be inputted.

The operation determination section 102 notifies the exclusive operation determination section 103 of the determined operation and the user information included in the received input information, and receives, from the exclusive operation determination section 103, a determination result which is obtained after an exclusive operation determination is performed. When a result of the exclusive operation determination is "continue", the operation determination section 102 notifies the content management section 104 of the operation and the user information. When the result of the determination is "copy", the operation determination section 102 notifies the content management section 104 of the operation, the user information, and a content copy notification. When the result of the determination is "ignore", the operation determination section 102 discards the operation, and does not notify the content management section 104. That is, when the operation is discarded, the newly inputted user operation is not reflected on the currently displayed content, and the currently displayed content is maintained as it is.

The content management section 104 is notified, by the operation determination section 102, of the operation and the user information. The content management section 104 generates display data which is obtained by reflecting the operation on the currently displayed content, based on the received operation. Then, the content management section 104 updates the content information stored in the content information storage section 107. Also, when the content management section 104 receives the content copy notification together with the operation, the content management section 104 transmits a content copy instruction to the content copying section 105. After the content copying section 105 completes copying, the content management section 104 generates display data which is obtained by reflecting the operation on the copied content.

Moreover, the content management section 104 determines a state of the content after the operation is reflected thereon, and notifies the exclusive operation determination section 103 of state information which is a result of the determination. When, based on a change of the state of the currently displayed content, the content management section 104 determines that a later-described exclusive operation information table is to be changed, the content management section 104 transmits a content change notification to the exclusive operation determination section 103. Also, the content management section 104 notifies the display section 106 of the generated display data. The state information will be described later.

The content copying section 105 receives the content copy instruction from the content management section 104, and, in accordance with the content copy instruction, copies the currently displayed content based on the content information stored in the content information storage section 107. Also, the content copying section 105 updates the content information stored in the content information storage section 107.

The content information storage section 107 stores therein, as the content information, information which is used for controlling a display of a content by using the web browser function. The content information includes management information such as address information (for example, a URL or a file name) indicating a location of a source of each content, information for identifying a location, where content data is stored, in a memory in the information processing apparatus 10. Additionally, the content information may include content display information which is used for generating display data to be displayed on the display section 106. Moreover, the content display information may include information of component parts of a content, which are obtained as a result of analysis of content data, information concerning a window for displaying a content, window position information indicating a position at which a window is displayed, content position information indicating a position at which a content is displayed in a window, and the like. Furthermore, the content information may include history information for maintaining an order of displayed contents as a history, and the like.

The content information storage section 107 stores therein the content information in accordance with the notifications from the content management section 104 and the content copying section 105. In response to a request, the content information storage section 107 notifies the operation determination section 102, the exclusive operation determination section 103, the content management section 104, the content copying section 105, or the like, of the content information stored therein.

The exclusive operation determination section 103 is notified of the operation and the user information by the operation determination section 102. The exclusive operation determination section 103 determines which one of the "copy", the "continue", and the "ignore" the process corresponding to the operation notified of is. The "copy" requires copying of a content. The "continue" indicates that a process is to be continuously performed without copying. The "ignore" indicates that an input operation performed by a user is to be ignored and no process is to be performed on a content. The exclusive operation determination section 103 notifies the operation determination section 102 of a result of the determination. Also, the exclusive operation determination section 103 stores, as an operation state, the operation notified of, information concerning an operator which is obtained from the user information, and the state information notified of by the content management section 104.

Next, each component part of the exclusive operation determination section 103 will be described. In the exclusive operation determination section 103, the determination control section 151 receives the operation and the user information from the operation determination section 102, and starts a process. The determination control section 151 acquires a previous operation state by inquiring of the operation state management section 152. Details of the operation state will be described later. The determination control section 151 acquires the most appropriate process from exclusive operation information stored in the exclusive operation information storage section 153. Based on the acquired process, the determination control section 151 determines which one of the "copy", the "continue", and the "ignore" the process is. The "copy" requires copying of a content. The "continue" indicates that a process is to be continuously performed without copying. The "ignore" indicates that an input performed by a user is to be ignored and no process is to be performed on a content. The determination control section 151 notifies the operation determination section 102 of a result of the determination. When the result of the determination is not the "ignore", the determination control section 151 notifies the operation state management section 152 of an operation time indicating a time at which the operation was performed, the operation, and the user information, and instructs management of the operation state.

Instructed by the determination control section 151, the operation state management section 152 manages the operation state. Specifically, the operation state management section 152 is notified by the determination control section 151 of the operation time, the user information, the operation, and the state information, and stores these information as the operation state. Also, in response to an inquiry from the determination control section 151, the operation state management section 152 acquires the operation state which is stored in the operation state storage section 154, and notifies the determination control section 151 of the operation state. Here, the operation state management section 152 may manage the operation state so as to delete the previously stored operation state and store only the most recent operation state. Alternatively, the operation state management section 152 may store a plurality of operation states and manage the operation states as an operation history.

The exclusive operation information storage section 153 stores therein exclusive operation information which is used for the determination control section 151 to determine whether or not a content needs to be copied. The operation state storage section 154 stores the operation state managed by the operation state management section 152.

In this manner, the exclusive operation control apparatus 100 of the present invention determines whether or not an operation performed in the cooperative work requires copying of a content. In accordance with a result of the determination, the exclusive operation control apparatus 100 copies a content which is being subjected to the cooperative work, and reflects the operation on the copy. Thereby, the exclusive operation control apparatus 100 continues the operation performed in the cooperative work, and at the same time can start a competing operation.

FIGS. 2A to 2C show examples of the exclusive operation information which is stored in the exclusive operation information storage section 153. Here, the exclusive operation information storage section 153 stores therein the exclusive operation information in the form of an exclusive operation information table in which a plurality of exclusive operation information are combined. FIG. 2A shows an example of the exclusive operation information table for a normal operation. FIG. 2B shows an example of the exclusive operation information table for a range selection. FIG. 2C shows an example of the exclusive operation information table for a playback of a video content. The determination control section 151 switches the exclusive operation information tables shown in FIGS. 2A to 2C, based on a change of the state of the currently displayed content.

In the example described above, the exclusive operation information storage section 153 stores therein three exclusive operation information tables. However, the exclusive operation information storage section 153 may store therein exclusive operation information tables other than of the above-described kinds, or the number of exclusive operation information tables stored may be arbitrary.

In the examples shown in FIGS. 2A to 2C, the exclusive operation information is information including a "No" item, a "previous operation" item, a "new operation" item, an "operator" item, an "elapsed time" item, a "state" item, and a "process" item. The "No" item is an identifier for identifying exclusive operation information in the table. Here, it is not necessary to provide the "No" item, if exclusive operation information can be identified in the table by, for example, using an address indicating a location of the exclusive operation information in the memory, or managing the exclusive operation information in a link form.

The "previous operation" item concerns a previous operation, and corresponds to an operation included in an operation state table (see FIG. 3) which is stored in the operation state storage section 154. The "new operation" item concerns the operation which is an object of the determination, and corresponds to the operation notified of by the operation determination section 102. The "operator" item is information indicating whether or not a user having performed the above-mentioned "previous operation" and a user having performed the "new operation" are the same. Whether or not the users are the same can be determined by using the user information included in the operation state which is stored in the operation state storage section 154 and the user information included in the operation which is notified of by the operation determination section 102.

The "elapsed time" item concerns a difference of times at which the above-mentioned "previous operation" is inputted and at which the "new operation" is inputted. Whether or not the "elapsed time" satisfies a condition can be determined by using time information included in the operation state which is stored in the operation state storage section 154 and a time at which the operation is notified of by the operation determination section 102. The "state" item indicates a state of a content. In the "process" item, any one of a "copy" action for copying a content, a "continue" action for continuously performing a process without copying, and an "ignore" action for ignoring a user input and performing no process on a content, is set.

The determination control section 151 determines corresponding exclusive operation information from the exclusive operation information table, by using the operation notified of by the operation determination section 102 and the previous operation state acquired from the operation state management section 152. That is, the operation determination section 102 determines the "previous operation" item, the "new operation" item, the "operator" item, the "elapsed time" item, and the "state" item, and selects corresponding exclusive operation information from the exclusive operation information table. The determination control section 151 determines information of the "process" item of the selected exclusive operation information, to be a "process" corresponding to the new user input, and notifies the operation determination section 102 of the "copy", the "continue", or the "ignore".

For example, in a case of using the exclusive operation information table shown in FIG. 2A, when operators of a plurality of input operations are "the same" based on the operation notified of by the operation determination section 102, corresponding exclusive operation information is No 1, and the determination control section 151 determines to perform the "continue" as the process. When, based on the operation notified of by the operation determination section 102, a previous operation among a plurality of input operations is the "return", a new operation among the plurality of input operations is the "return", operators of a plurality of input operations are "different", and an elapsed time from the previous operation to the new operation is "less than one second", corresponding exclusive operation information is the item of No 2, and the determination control section 151 determines to perform the "ignore" as the process. As for No 3 and subsequent Nos, the determination control section 151 similarly determines a corresponding process.

In a case of using the exclusive operation information table shown in FIG. 2B, when a new operation among a plurality of input operations is "release selection" based on the operation notified of by the operation determination section 102, corresponding exclusive operation information is No 1, and the determination control section 151 determines to perform the "continue" as the process. When operators of a plurality of input operations are "the same" based on the operation notified of by the operation determination section 102, corresponding exclusive operation information is No 2, and the determination control section 151 determines to perform the "continue" as the process. As for No 3 and subsequent Nos, the determination control section 151 similarly determines a corresponding process.

In a case of using the exclusive operation information table shown in FIG. 2C, when a new operation among a plurality of input operations is "pause" based on the operation notified of by the operation determination section 102, corresponding exclusive operation information is No 1, and the determination control section 151 determines to perform the "continue" as the process. When operators of a plurality of input operations are "the same" based on the operation notified of by the operation determination section 102, corresponding exclusive operation information is No 2, and the determination control section 151 determines to perform the "continue" as the process. As for No 3 and subsequent Nos, the determination control section 151 similarly determines to perform a corresponding process.

FIG. 3 shows an example of the operation state which is stored in the operation state storage section 154. Here, a plurality of operation, states are stored as an operation history in the form of a table. As shown in FIG. 3, the operation state is information including an "operation time" item, an "operator" item, an "operation" item, and a "state information" item. One operation state is determined by a user operation being received and reflected on a content. The "operation time" item indicates a time at which the operation was performed. Here, although the "operation time" is represented by a time that elapses after a web browser starts, a time difference between a previous operation and a current operation may be stored as the "operation time".

The "operator" item indicates a user who has performed the input operation, and a user name is set in the "operator" item. The "operation" item indicates a type of the operation which was performed. The "state information" item is information indicating a state of a content after the operation is reflected on the content, and indicates a scroll state such as whether or not scroll is allowed, a form state during an input, and the like. For example, if the lowermost line of a content is already displayed, the "state information" indicates that scroll-down is not allowed. If a form part is displayed at an uppermost portion and a character is currently inputted into the form, the "state information" indicates that scroll-down causes the form to be out of the screen, because if scroll-down is performed the form part becomes out of the screen and is not displayed.

FIG. 4 is a flowchart showing an exemplary operation of the exclusive operation control apparatus 100 according to the embodiment of the present invention. Hereinafter, an operation of the exclusive operation control apparatus 100 will be described with reference to FIG. 4.

Firstly, the input section 101 receives a user instruction as an input operation from the outside, and notifies the exclusive operation control apparatus 100 of input information corresponding to the received input operation. When the input section 101 is a keyboard, the input section 101 notifies the operation determination section 102 of an inputted key code as the input information. When the input section 101 is a touch panel, the input section 101 notifies the operation determination section 102 of a positional relationship between a starting point and an end point of user's touch on the touch panel, as the input information. Note that the input information notified of includes the user information, as described above.

The operation determination section 102 receives the input information including the user information from the input section 101 (step S201).

Then, the operation determination section 102 acquires, from the content information storage section 107, content information representing a currently displayed content on which a cooperative operation is to be performed (step S202).

Then, the operation determination section 102 interprets the user instruction and determines an operation, based on the received input information and the content information (step S203). For example, in a case where the input section 101 designates up, down, left, and right, the operation determination section 102 determines that the operation is the "return" operation when the input is the left, that the operation is the "advance" operation when the input is the right, that the operation is the "scroll-up" operation when the input is the up, and that the operation is the "scroll-down" operation when the input is the down. In a case where the input section 101 selects a portion of the currently displayed content, the operation determination section 102 determines, by using the acquired content information representing the currently displayed content, that the operation is the "character input" operation when a part displayed at the selected position is a text input form, and that the operation is the "link selection" operation when a part displayed at the selected position is an anchor.

The operation determination section 102 notifies the determination control section 151 of the exclusive operation determination section 103, of the determined operation and the user information included in the received input information, and requests an exclusive operation determination (step S204).

The determination control section 151 inquires of the operation state management section 152, and acquires a previous operation state from the operation state table (see FIG. 3) stored in the operation state storage section 154 (step S205). Note that the previous operation state includes the operation time, the operator, the operation, and the state information.

The determination control section 151 performs the exclusive operation determination by using the operation notified of by the operation determination section 102 and the previous operation state acquired from the operation state management section 152 (step S206). Firstly, the determination control section 151 determines the "previous operation" item, the "new operation" item, the "operator" item, the "elapsed time" item, and the "state" item, and determines corresponding exclusive operation information from the exclusive operation information table (see FIGS. 2A to 2C) stored in the exclusive operation information storage section 153.

The determination control section 151 notifies the operation determination section 102 of information of the "process" item of the determined exclusive operation information, as an exclusive operation determination result corresponding to the new user input. That is, the operation determination section 102 is notified, by the determination control section 151, of any one of the "copy" requiring copying of the content, the "continue" indicating that the process is to be continuously performed without copying, and the "ignore" indicating that the user input is to be ignored and no process is to be performed on the content.

Based on the determination result notified of, the operation determination section 102 switches the process as follows (step S207). When the determination result is the "ignore" (ignore in step S207), the operation determination section 102 discards the operation, and terminates a series of processes on the input (step S208). When the determination result is the "continue" (continue in step S207), the operation determination section 102 notifies the content management section 104 of the operation and the user information, and the process transits to step S209. When the determination result is the "copy" (copy in step S207), the operation determination section 102 notifies the content management section 104 of the operation, the user information, and the content copy notification, and the process transits to step S210.

The content management section 104 performs an operation on the currently displayed content, based on the operation notified of by the operation determination section 102. At this time, the content management section 104 generates display data on which the operation is reflected, and updates the corresponding content information in the content information storage section 107 (step S209).

The content management section 104 receives the content copy notification, and sends a content copy instruction to the content copying section 105. In accordance with the content copy instruction, the content copying section 105 copies the corresponding content based on the content information stored in the content information storage section 107, and updates the content information in the content information storage section 107 (step S210).

The content management section 104 performs an operation on the copied content, based on the operation notified of by the operation determination section 102. At this time, the content management section 104 generates display data in which the operation is reflected, and updates the content information in the content information storage section 107 (step S211).

The content management section 104 determines a state of the content after the operation is reflected thereon, handles a result of the determination as the state information, and notifies the exclusive operation determination section 103 of the operation, the user information, and the state information. In the exclusive operation determination section 103, the operation state management section 152 handles the information notified of as the most recent operation state, and stores the most recent operation state in the operation state storage section 154 (step S212).

The content management section 104 determines whether or not the exclusive operation information table is to be switched, based on a change of the state of the currently displayed content. When the content management section 104 determines that the exclusive operation information table is to be switched, the content management section 104 notifies the exclusive operation determination section 103 of the content change notification (step S213). For example, when a "range selection" operation occurs during a normal display of a content, the content management section 104 switches the exclusive operation information table from the exclusive operation information table for a normal operation (FIG. 2A) to the exclusive operation information table for a range selection (FIG. 2B). Alternatively, when a "video content playback" operation occurs during a normal display of a content, the content management section 104 switches the exclusive operation information table from the exclusive operation information table for a normal operation (FIG. 2A) to the exclusive operation information table for a playback of a video content (FIG. 2C).

Finally, the content management section 104 notifies the display section 106 of the generated display data. The display section 106 displays the display data notified of (step S214).

FIGS. 5A to 5C, FIGS. 6A and 6B, and FIGS. 7A and 7B show examples of an image of a display screen of the information processing apparatus 10 including the exclusive operation control apparatus 100 according to the present embodiment. Hereinafter, by using the above-mentioned drawings, an exclusive operation determination process in step S206 of FIG. 4 will be described. An example below is on the assumption that, after the web browser starts, input operations are performed in an order shown in FIG. 3, and a user A and a user B perform a cooperative operation.

An action in a case where the user B performs the "return" operation at the time of 100.5 seconds after the web browser starts, will be described. A previous operation (at the time of 100.0 seconds) is the "return" operation. The previous operation is performed by the user A, and a new operation is performed by the user B. Operators of the previous operation and the new operation are different from each other. An elapsed time after the previous operation is 0.5 seconds. By using these information, the determination control section 151 selects No 2 of the exclusive operation information table of FIG. 2A, as corresponding exclusive operation information. That is, the determination control section 151 considers that the two "return" operations performed at the time of 100.0 seconds and at the time of 100.5 seconds are the same request that has been simultaneously performed, and determines to perform the "ignore" for performing the "return" operation only once.

An action in a case where the user A performs the "scroll-up" operation at the time of 210.5 seconds, will be described. A previous operation (at the time of 210.0 seconds) is the "return" operation. The previous operation is performed by the user B, and a new operation is performed by the user A. Operators of the previous operation and the new operation are different from each other. An elapsed time after the previous operation is 0.5 seconds. State information in the previous operation is "the scroll-up is not allowed". By using these information, the determination control section 151 selects No 4 of the exclusive operation information table of FIG. 2A, as corresponding exclusive operation information. That is, since the display at the previous operation time of 210.0 seconds does not allow the "scroll-up operation", the determination control section 151 determines that the "return operation" at the time of 210.0 seconds and the "scroll-up operation" at the time of 210.5 seconds are competing operations which occur in a state before the time of 210.0, and determines to perform the "copy". Here, since the "return" operation at the time of 210.0 seconds has already been performed, display data is generated by performing the "advance" operation and then performing the "scroll-up" operation, and a copied content is displayed.

Figure 5A:
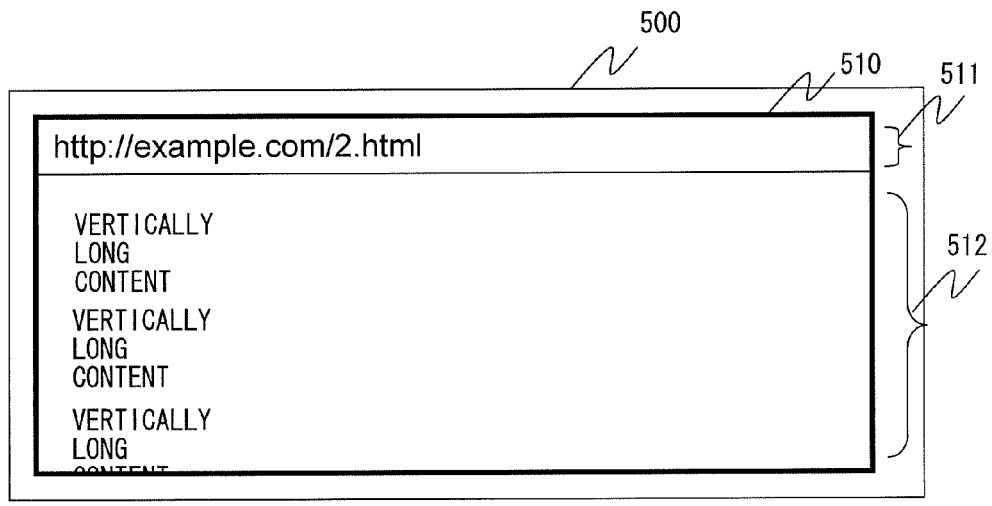
FIG. 5A shows an image of a display screen of a display section 106 at the time of 200.0 seconds.
Figure 5B:
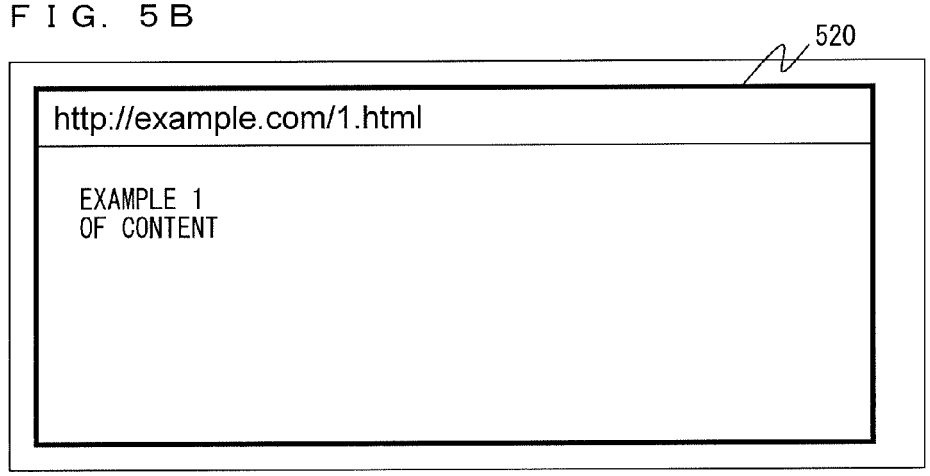
FIG. 5B shows an image of the display screen of the display section 106 at the time of 210.0 seconds.
Figure 5C:
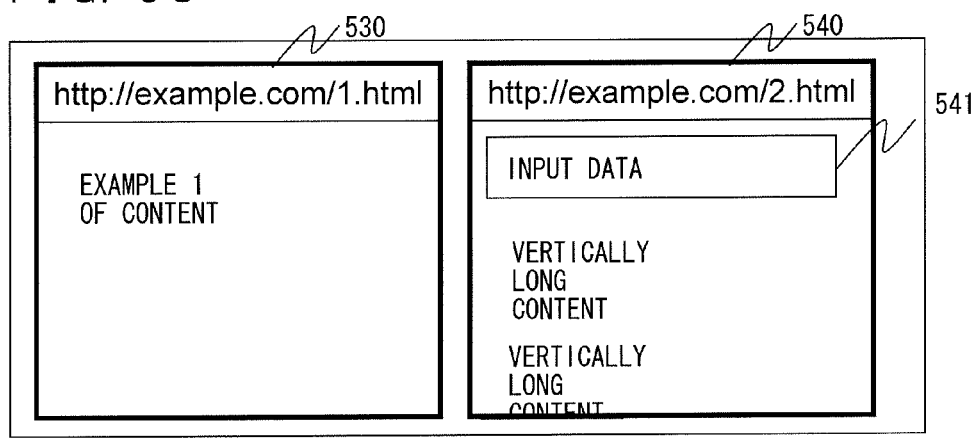
FIG. 5C shows an image of the display screen of the display section 106 after a process is performed at the time of 210.5 seconds.

FIG. 5A shows an image of the display screen of the display section 106 at the time of 200.0 seconds. FIG. 5B shows an image of the display screen of the display section 106 at the time of 210.0 seconds. FIG. 5C shows an image of the display screen of the display section 106 after the process at the time of 210.5 seconds is performed. Referring to FIG. 5A, a window 510 is displayed on the display screen 500. A content (http://example.com/2.html) is displayed in the window 510. The window 510 has an address display area 511 in which a content source address is displayed, and a content display area 512 in which a content is displayed.

The content (http://example.com/2.html) of FIG. 5A is displayed, subsequently a content (http://example.com/1.html) of FIG. 5B is displayed, and the "scroll-up" operation is inputted. At this time, since it is determined to perform the "copy" action, two windows 530 and 540 are displayed as shown in FIG. 5C. A content displayed in the window 530 is the currently displayed content (httpi/example.com/1.html), and is identical to the content shown in FIG. 5B. In the window 540, display data obtained after the "scroll-up" operation is performed on the copied content (http://example.com/2.html), is displayed.

In FIGS. 5A to 5C mentioned above, an action performed when the "return" operation at the time of 210.0 seconds and the "scroll-up" operation at the time of 210.5 seconds are performed, is as follows: generation of the copied content (the window 540 of FIG. 5C) is realized by performing the "scroll-up" operation on a content display obtained after the "return" operation is cancelled by performing the "advance" operation on the content display at the time of 210.5 seconds. However, the exclusive operation control apparatus 100 may delay fixing of each operation by a predetermined time period (for example, one second). In this case, by postponing the reflection of the "return" operation at the time of 210.0 seconds until the time of 211.0 seconds, the exclusive operation control apparatus 100 can perform the "scroll-up" operation on the content display at the time of 210.0 seconds.

The exclusive operation control apparatus 100 may change the time of the state of the content which is used for determining that the above-described process is continue, copy or ignore. In the above-described example, in the exclusive operation determination for the "return" operation at the time of 210.0 seconds and the "scroll-up" operation at the time of 210.5 seconds, the exclusive operation control apparatus 100 determines the above-described process based on the state (in the example of FIG. 3, scroll-up is not allowed) of the content after the "return" operation is performed at the time of 210.0 seconds. However, the exclusive operation control apparatus 100 may determine the above-described process based on the state of the content before the "return" operation is performed at the time of 210.0 seconds. Furthermore, the exclusive operation control apparatus 100 may use, in combination, the state of the content at the time of 210.0 seconds and the state of the content at the time of 210.5 seconds.

Referring to FIG. 3, an action in a case where the user B performs the "scroll-down" operation at the time of 301.0 seconds, will be described. A previous operation (at the time of 300.0 seconds) is the "character input" operation. The previous operation is performed by the user A, and a new operation is performed by the user B. Operators of the previous operation and the new operation are different from each other. A state is "scroll-down causes the form to be out of the screen". By using these information, the determination control section 151 selects No 7 of the exclusive operation information table of FIG. 2A, as corresponding exclusive operation information. That is, since the "character input" operation cannot be continued if the form is moved out of the screen by the "scroll-down operation" in the character input state, the exclusive operation control apparatus 100 determines to perform the "copy" action in order that the character input can be continued, and performs the scroll-down on a copied content.

Figure 6A:
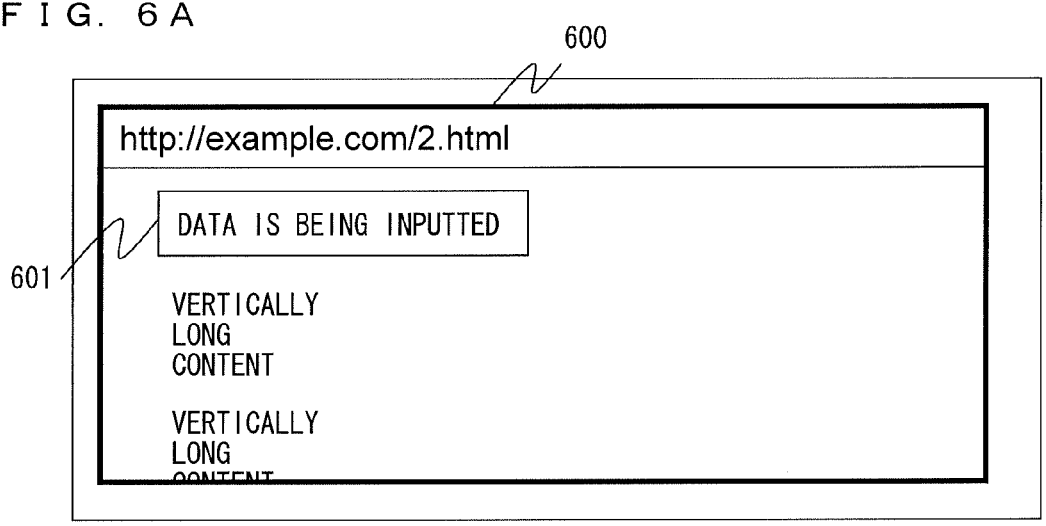
FIG. 6A shows an image of the display screen of the display section 106 at the time of 300.0 seconds.
Figure 6B:
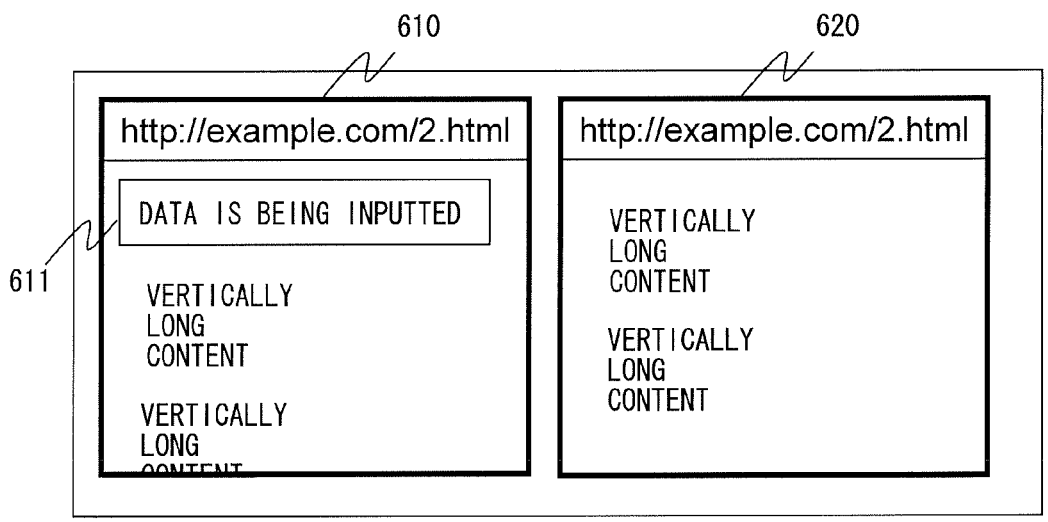
FIG. 6B shows an image of the display screen of the display section 106 at the time of 301.0 seconds.

FIG. 6A shows an image of the display screen of the display section 106 at the time of 300.0 seconds. FIG. 6B shows an image of the display screen of the display section 106 at the time of 301.0 seconds. In FIG. 6A, a content (http://example-.com/2.html) is displayed in a window 600, and a character is being inputted in an input form 601. Here, the "scroll-down" operation is inputted, and it is determined to perform the "copy" action. Thus, two windows 610 and 620 are displayed as shown in FIG. 6B. A content displayed in the window 610 is the currently displayed content (hupi/example.com/2.html), and is identical to the content shown in FIG. 6A. In the window 610, the character input is continued. In the window 620, display data obtained after the "scroll-down" operation is performed on the copied content (http://example-.com/2.html) so that the input form 611 is moved out of the screen, is displayed.

Referring to FIG. 3, an action in a case where the user A performs the "return" operation at the time of 401.0 seconds, will be described. A previous operation (at the time of 400.0 seconds) is the "range selection" operation. The previous operation is performed by the user B, and a new operation is performed by the user A. Operators of the previous operation and the new operation are different from each other. The "range selection" operation for a content is performed at the time of 400.0 seconds, and the exclusive operation information table is switched to the table of FIG. 2B. By using these information, the determination control section 151 selects No 3 of the exclusive operation information table of FIG. 2B, as corresponding exclusive operation information. That is, since the "range selection" operation cannot be continued if the "return" operation is performed at the time of 401.0 seconds, the determination control section 151 determines to perform the "copy" action in order that the "return" operation can be performed while the range selection is maintained.

Figure 7A:
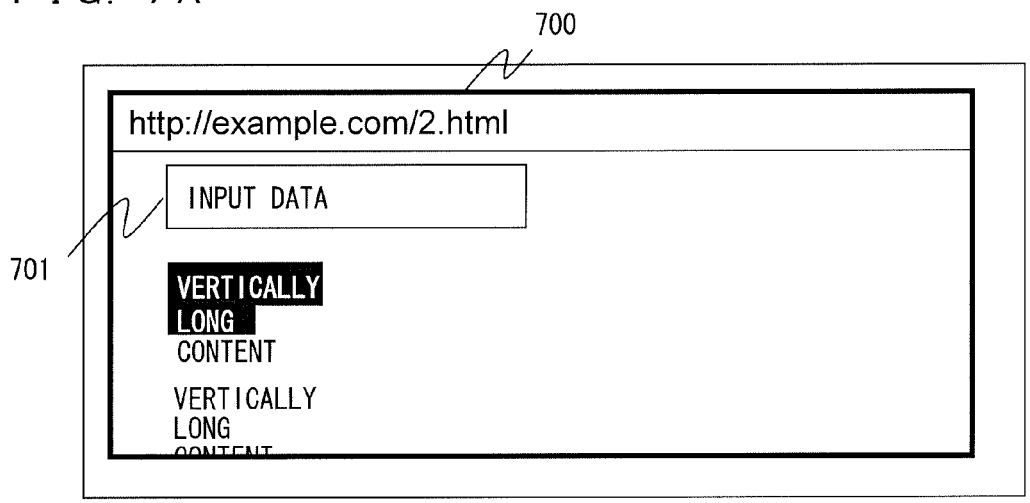
FIG. 7A shows an image of the display screen of the display section 106 at the time of 400.0 seconds.
Figure 7B:
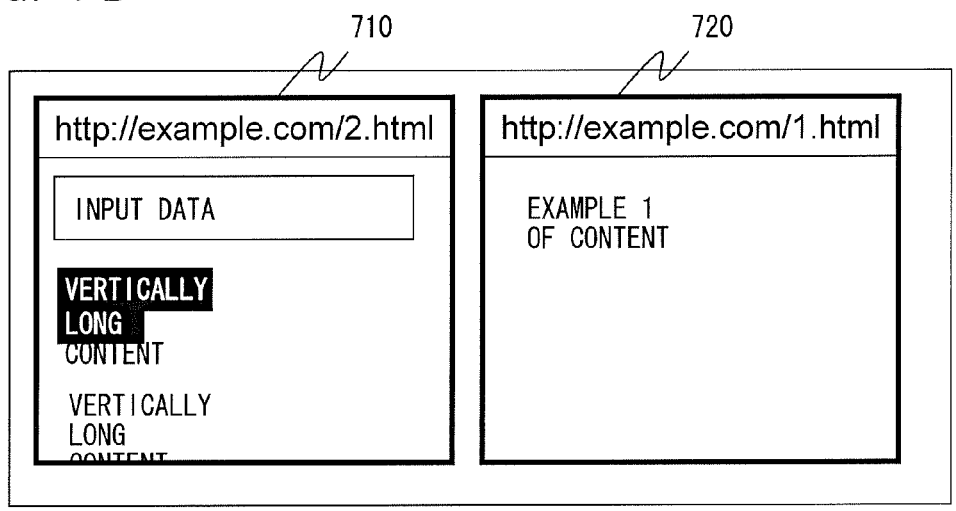
FIG. 7B shows an image of the display screen of the display section 106 at the time of 401.0 seconds.

FIG. 7A shows an image of the display screen of the display section 106 at the time of 400.0 seconds. FIG. 7B shows an image of the display screen of the display section 106 at the time of 401.0 seconds. In FIG. 7A, a content (http://example-.com/2.html) is currently displayed in the window 700, and a partial region of the content is selected in the "range selection". Here, the "return" operation is inputted, and it is determined to perform the "copy" action. Thus, two windows 710 and 720 are displayed as shown in FIG. 7B. A content displayed in the window 710 is the currently displayed content (http://example.com/2.html), and is identical to the content shown in FIG. 7A. In the window 710, the "range selection" is continued. In the window 720, a content (http://example-.com/1.html) obtained by performing the "return" operation on the copied content (http://example.com/2.html), is displayed. In the drawing, a highlighted part "vertically long" indicates a region selected in the "range selection" by the user.

Referring to FIG. 3, an action in a case where the user B performs the "return" operation at the time of 500.5 seconds, will be described. A previous operation (at the time of 500.0 seconds) is the "playback" operation. The previous operation is performed by the user A, and a new operation is performed by the user B. Operators of the previous operation and the new operation are different from each other. The "playback" operation for a content is performed at the time of 500.0 seconds, and the exclusive operation information table is switched to the table of FIG. 2C. By using these information, the determination control section 151 selects No 3 of the exclusive operation information table of FIG. 2C, as corresponding exclusive operation information. That is, since the "playback" operation cannot be continued if the "return" operation is performed at the time of 500.5 seconds, the determination control section 151 determines to perform the "copy" action in order that the "return" operation can be performed while the playback is maintained.

Figure 8A:
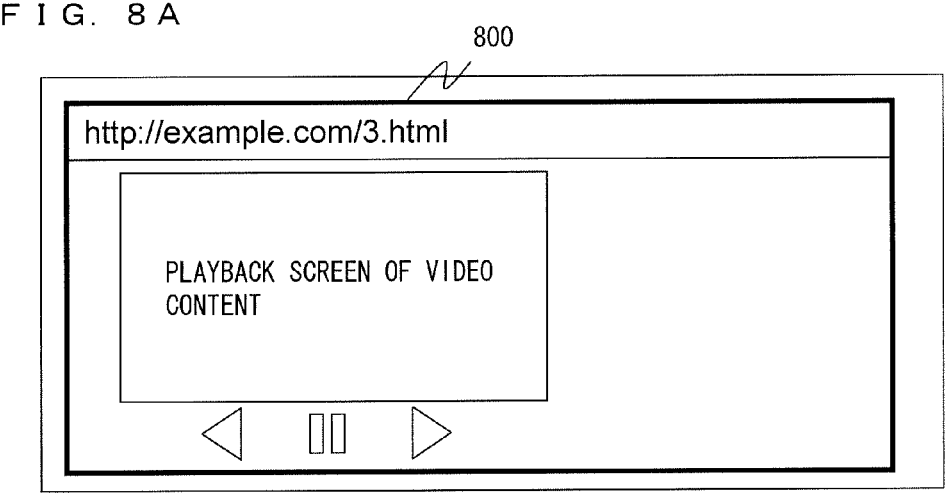
FIG. 8A shows an image of the display screen of the display section 106 at the time of 500.0 seconds.
Figure 8B:
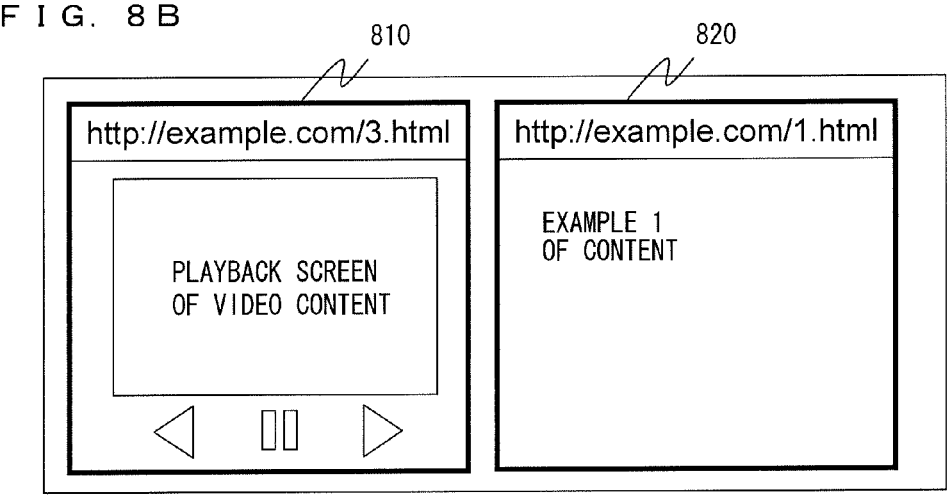
FIG. 8B shows an image of the display screen of the display section 106 at the time of 500.5 seconds.

FIG. 8A shows an image of the display screen of the display section 106 at the time of 500.0 seconds. FIG. 8B shows an image of the display screen of the display section 106 at the time of 500.5 seconds. In FIG. 8A, a content (http://example-.com/3.html) is displayed in a window 800, and a playback screen of a video content is displayed. Here, the "return" operation is inputted, and it is determined to perform the "copy" action. Thus, two windows 810 and 820 are displayed as shown in FIG. 8B. A content displayed in the window 810 is the currently displayed content (http://example.com/3.html), and is identical to the content shown in FIG. 8A. In the window 810, the playback screen of the video content is continuously displayed. In the window 820, a content (http://example.com/1.html) obtained by performing the "return" operation on the copied content (http://example.com/3.html), is displayed.

As above, when operations performed by a plurality of users compete with each other during a cooperative work, the exclusive operation control apparatus 100 according to the present invention can determine which is desirable, copying a content, displaying a content as it is without copying, or ignoring the input operation of the user. When it is determined that a content needs to be copied, the content can be automatically copied and displayed without the user performing a copy operation. Therefore, even when operations performed by a plurality of users compete with each other, the content is automatically copied and displayed, and thereby contents on which the operations of the plurality of users are reflected can be simultaneously displayed without any influence on an operation performed in the cooperative work.

The effective use of the exclusive operation control apparatus 100 according to the present invention is not limited to in a web browser. For example, in a cooperative work of performing a presentation by using PowerPoint or the like, when a member of audience of the presentation performs another operation for seeing the previous and next pages of the presentation, a currently presented display screen and the previous and next display screens can be simultaneously displayed. In recent years, not only a presentation method using PowerPoint but also a presentation method using a web browser is practiced. The exclusive operation control apparatus 100 according to the present invention is also applicable to a case where, during a presentation, data can be inputted on another display screen and the inputted data can be used in the presentation. Moreover, the exclusive operation control apparatus 100 according to the present invention is also applicable to a case where, in reviewing a created document file, relevant context is checked and then whether or not a currently presented part is correct is determined.

In copying a content, the content management section 104 confirms whether or not the copied content can be placed in a free space on the display screen. When the copied content can be placed, a window for displaying the copied content is placed in the free space. When the copied content cannot be placed, the content management section 104 may change the size of an already-displayed window so as to create a free space, and may place a window for displaying the copied content in the free space (for example, see FIG. 5C, FIG. 6B, FIG. 7B, and the like).

Also, the content management section 104 may determine a region for displaying a copied content and a region for displaying an original content, based on the position of an operator. Moreover, the content management section 104 may display a split screen using a dividing line so as to divide a content display region in accordance with the positions of operators. Furthermore, when an operator performs an operation which causes a content to be copied, the content management section 104 may display a new window near the operator.

FIG. 9A is an imaginary picture showing that six operators (users A to F) around a table-shaped display device perform a cooperative work. Referring to FIG. 9A, the eighth page of a content which is currently subjected to a cooperative work is displayed on the display device, and it is assumed that the user B and the user C are performing operations such as the character input operation and the range selection on the eighth page of the content. An action in a case where, under the state of FIG. 9A, the user A inputs an operation for displaying the seventh page of the content and the exclusive operation control apparatus 100 determines to perform the "copy", will be described. FIG. 9B shows an imaginary picture after the user A inputs the operation for displaying the seventh page of the content under the above-mentioned state of FIG. 9A. Referring to FIG. 9B, the exclusive operation control apparatus 100 copies the seventh page of the content and displays a new window that displays the seventh page of the content near the position of the user A. The eighth page of the content which is currently subjected to the cooperative work is continuously displayed on the display device.

Figure 10A:
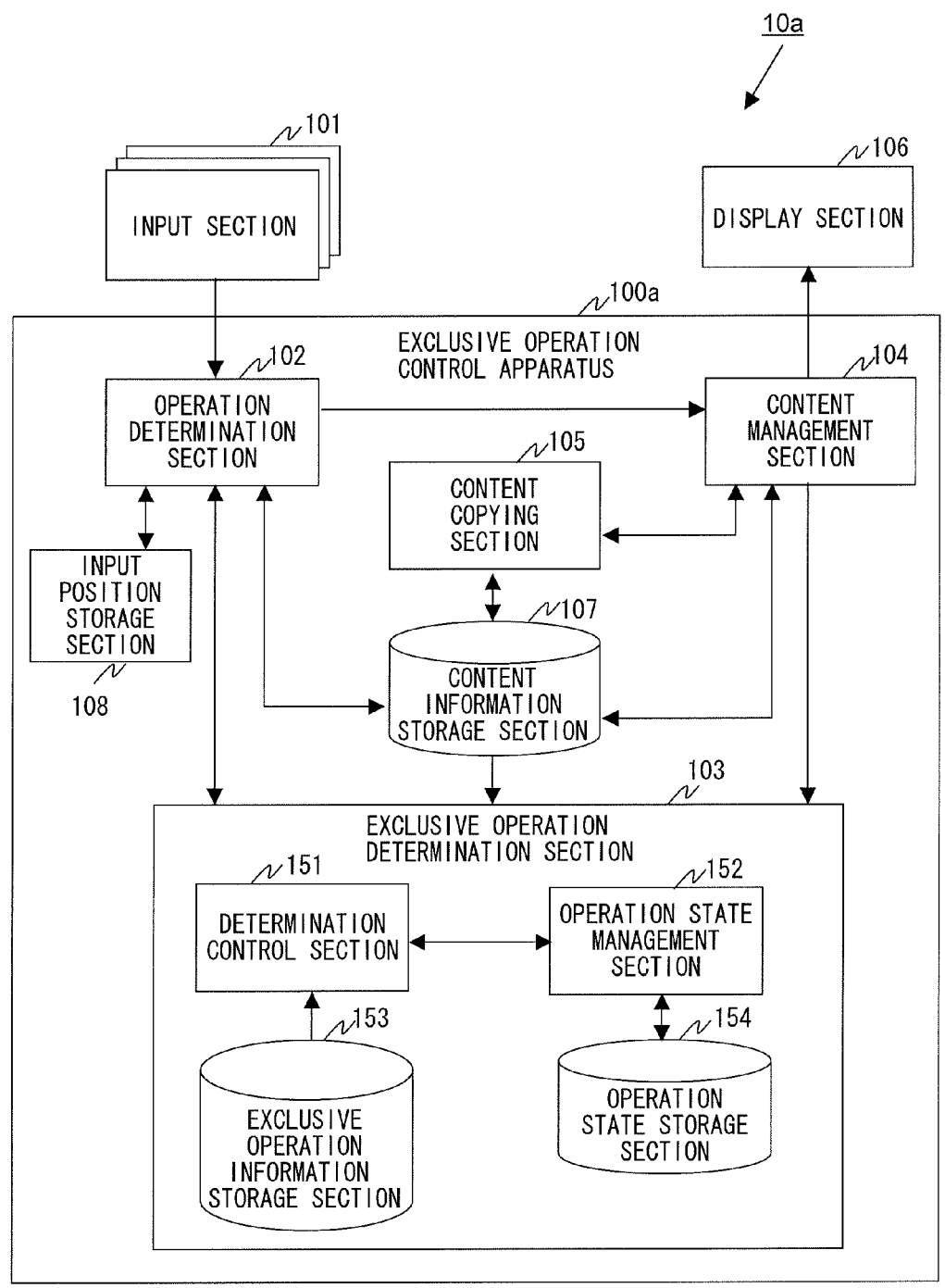

In this manner, determining the display position of a copied window in accordance with the position of an operator can be realized by using an exclusive operation control apparatus 100a as shown in FIG. 10A, for example. FIG. 10A is a block diagram showing an exemplary configuration of an information processing apparatus 10a including the exclusive operation control apparatus 100a. Referring to FIG. 10A, the exclusive operation control apparatus 100a further includes an input position storage section 108. In the input position storage section 108, an input position of an operator is stored in advance. When the content management section 104 copies a content, the content management section 104 inquires of the operation determination section 102 for the position of an operator. The operation determination section 102 reads out the position of the operator from the input position storage section 108, and transmits the position of the operator to the content management section 104. Based on the position of the operator, the content management section 104 determines a region for displaying the copied content and a region for displaying the original content.

The exclusive operation control apparatus 100 may prepare two or more displays as the display section 106, and may display a content for a cooperative work on one display while displaying a content for a user performing another operation on the other display.

In the description of the present embodiment, the operation state stored in the operation state storage section 154 has the items of the "operation time", the "operator", the "operation", and the "state information". However, the operation state may not necessarily have all of these items, and may have at least one of the items. Moreover, when the determination control section 151 determines the number of users simultaneously using the content, a time for which each user continues using the content, and the like, the determination control section 151 may use operation information stored in the operation state storage section 154.

In the present embodiment, the description has been made by using the web browser function. However, the exclusive operation control apparatus 100 is applicable not only to the web browser function but also to document creation applications, presentation applications, and the like.

In the present embodiment, the input section 101 and the user are in one-to-one correspondence with each other. However, a method other than the one-to-one correspondence between the input section 101 and the user may be used, such as a method of applying a microcurrent which enables identification of each user to the input section 101 and identifying the user based on the microcurrent which passes when the touch panel is operated.

In the present embodiment, the display data is outputted from the content management section 104 to the display section 106. Here, a sound effect may be made when an operation is performed. In this case, the exclusive operation determination section 103 may perform an exclusive control concerning an audio output, such as whether or not the sound effect is to be made and which of a plurality of speakers or earphones is to output the sound effect.

Each of the above-described process steps performed by the exclusive operation control apparatus 100 may be realized by a CPU interpreting and executing predetermined program data which is stored in a storage device (such as a ROM, a RAM, or a hard disk) and which enables execution of the above-described process steps. In this case, the program data may be introduced into the storage device via a storage medium, or may be executed directly from the storage medium. The storage medium includes a semiconductor memory such as a ROM, a RAM, a flash memory, and the like, a magnetic memory such as a flexible disc, a hard disc, and the like, an optical disc memory such as a CD-ROM, a DVD, a BD, and the like, a memory card, and the like. The storage medium has a concept including a communication medium such as a telephone line, a carrying path, and the like.

Figure 10B:
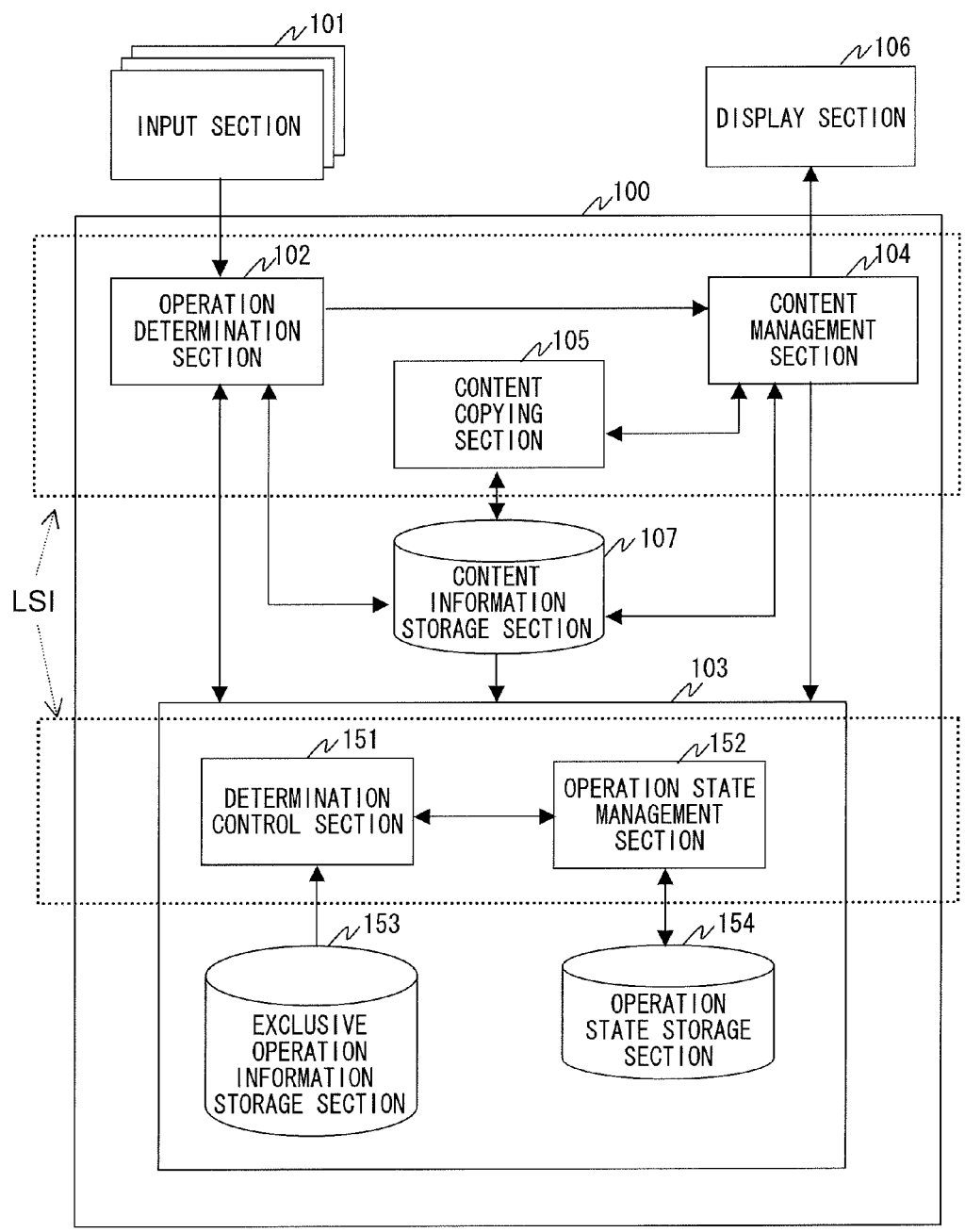
FIG. 10B is a block diagram showing an exemplary configuration of the exclusive operation control apparatus 100, 100a which is realized by using an LSI.

As shown in FIG. 10B, each of the components (such as the operation determination section 102, the content management section 104, the content copying section 105, the determination control section 151, and the operation state management section 152) of the exclusive operation control apparatus 100, 100a described above can be achieved as an LSI which is an integrated circuit. They may be individually made into one chip, or a part or all of them may be made into one chip. Although the LSI is described here, the integrated circuit may be referred to as an IC, a system LSI, a super LSI, or an ultra LSI depending on difference in integration degrees.

A technique of integrated circuit implementation is not limited to the LSI, but may be achieved by a dedicated circuit or a universal processor. An FPGA (Field Programmable Gate Array) which is programmable after production of an LSI, and a reconfigurable processor in which the connection and the setting of a circuit cell inside the LSI are reconfigurable, may be used. Further, needless to say, if a technique of integrated circuit implementation, which replaces the LSI, appears as a result of advancement of semiconductor technique or another technique derived therefrom, function blocks may be integrated by using the technique. Adaptation of a bio technique could be one possibility.

INDUSTRIAL APPLICABILITY

The exclusive operation control apparatus according to the present invention has the function of automatically copying a content when a plurality of operations compete with each other during a cooperative work, and is useful as an information processing apparatus or the like which can be simultaneously operated by a plurality of users. Also, the exclusive operation control apparatus according to the present invention is applicable to game apparatuses, car navigation devices, and the like.

REFERENCE SIGNS LIST 10, 10a information processing apparatus
100, 100a exclusive operation control apparatus
101 input section
102 operation determination section
103 exclusive operation determination section
104 content management section
105 content copying section
106 display section
107 content information storage section
108 input position storage section
151 determination control section
152 operation state management section
153 exclusive operation information storage section
154 operation state storage section

The invention claimed is:

1. An exclusive operation control apparatus which receives input operations on a content displayed on a display device from a plurality of users and controls an exclusive operation, the exclusive operation control apparatus comprising:
  an operation determination section that receives input information from the plurality of users, and determines an operation based on the input information when the operation determination section receives the input information;
  an exclusive operation determination section that determines a new exclusive operation concerning a new operation determined by the operation determination section by using (i) the new operation determined by the operation determination section and (ii) a previous operation determined by the operation determination section;
  a content copying section that copies the content based on a result of the determination performed by the exclusive operation determination section; and
  a content management section that (i) generates, when the new operation determined by the operation determination section is instructed to the copied content, display data which is obtained by reflecting the new operation determined by the operation determination section on the copied content and (ii) displays the display data on the display device,
  wherein the exclusive operation determination section includes:
    an exclusive operation information storage section that stores therein exclusive operation information which includes at least (i) the new operation determined by the operation determination section and (ii) the previous operation determined by the operation determination section;
    an operation state management section that manages (i) the new operation determined by the operation determination section and (ii) the previous operation determined by the operation determination section;
    an operation state storage section that stores therein (i) the new operation managed by the operation state management section and (ii) the previous operation managed by the operation state management section; and
    a determination control section that (i) determines the new exclusive operation concerning the new operation determined by the operation determination section by using the previous operation managed by the operation state management section and the exclusive operation information stored in the exclusive operation information storage section and (ii) determines whether or not the content is to be copied.

2. The exclusive operation control apparatus according to claim 1, wherein
  wherein the exclusive operation information storage section stores therein the exclusive operation information as a plurality of exclusive operation information tables,
  wherein the content management section determines whether or not the exclusive operation information table is to be switched based on a change of a state of the content on which the new operation is reflected and, when the content management section determines that the exclusive operation information table is to be switched, notifies the exclusive operation determination section of a content change notification, and
  wherein when the determination control section receives the content change notification from the content management section, the determination control section switches the exclusive operation information table to be used.

3. The exclusive operation control apparatus according to claim 1, wherein the determination control section determines which action is to be performed for the new operation determined by the operation determination section from among (i) copying the content and displaying the copied content on the display device, (ii) continuing a process without copying the content, and (iii) ignoring the new operation on the content.

4. The exclusive operation control apparatus according to claim 1, wherein, when the determination control section determines to continue a process without copying the content, the content management section generates and displays, on the display device, the display data obtained by reflecting the new operation on the content that is before the copying.

5. The exclusive operation control apparatus according to claim 1,
  wherein the exclusive operation control apparatus further includes an input position storage section that in advance stores therein input positions of the plurality of users, and
  wherein when the content is to be copied and displayed on the display device, the content management section determines a region for displaying the copied content based on the position of the user having inputted the new operation.

6. A method performed by an exclusive operation control apparatus which receives input operations on a content displayed on a display device from a plurality of users and controls an exclusive operation, the method comprising:
  an operation determination step of receiving input information from the plurality of users, and determining an operation based on the input information when the operation determination step receives the input information;

an exclusive operation determination step of determining a new exclusive operation concerning a new operation determined in the operation determination step by using (i) the new operation determined in the operation determination step and (ii) a previous operation determined in the operation determination step;
a content copying step of copying the content based on a result of the determination performed in the exclusive operation determination step; and
a content management step of (i) generating, when the new operation determined in the operation determination step is instructed to the copied content, display data which is obtained by reflecting the new operation determined in the operation determination step on the copied content and (ii) displaying the display data on the display device,
wherein the exclusive operation determination step includes:
an operation state management step of managing (i) the new operation determined in the operation determination step and (ii) the previous operation determined in the operation determination step; and
a determination control step of (i) determining the new exclusive operation concerning the new operation determined in the operation determination step by using the previous operation managed in the operation state management step and exclusive operation information, the exclusive operation information including at least (a) the new operation determined in the operation determination step and (b) the previous operation determined in the operation determination step and (ii) determining whether or not the content is to be copied.

7. A non-transitory computer readable recording medium having stored thereon a program executed by an exclusive operation control apparatus which receives input operations on a content displayed on a display device from a plurality of users and controls an exclusive operation, the program causing the exclusive operation control apparatus to perform a method comprising:
an operation determination step of receiving input information from the plurality of users, and determining an operation based on the input information when the operation determination step receives the input information;
an exclusive operation determination step of determining a new exclusive operation concerning a new operation determined in the operation determination step by using (i) the new operation determined in the operation determination step and (ii) a previous operation determined in the operation determination step;
a content copying step of copying the content based on a result of the determination performed in the exclusive operation determination step; and
a content management step of (i) generating, when the new operation determined in the operation determination step is instructed to the copied content, display data which is obtained by reflecting the new operation determined in the operation determination step on the copied content and (ii) displaying the display data on the display device,
wherein the exclusive operation determination step includes:
an operation state management step of managing (i) the new operation determined in the operation determination step and (ii) the previous operation determined in the operation determination step; and
a determination control step of (i) determining the new exclusive operation concerning the new operation determined in the operation determination step by using the previous operation managed in the operation state management step and exclusive operation information, the exclusive operation information including at least (a) the new operation determined in the operation determination step and (b) the previous operation determined in the operation determination step and (ii) determining whether or not the content is to be copied.

8. An integrated circuit for use in an exclusive operation control apparatus which receives input operations on a content displayed on a display device from a plurality of users and controls an exclusive operation, the integrated circuit comprising:
an operation determination section that receives input information from the plurality of users, and determines an operation based on the input information when the operation determination section receives the input information;
an exclusive operation determination section that determines a new exclusive operation concerning a new operation determined by the operation determination section by using (i) the new operation determined by the operation determination section and (ii) a previous operation determined by the operation determination section;
a content copying section that copies the content based on a result of the determination performed by the exclusive operation determination section; and
a content management section that (i) generates, when the new operation determined by the operation determination section is instructed to the copied content, display data which is obtained by reflecting the new operation determined by the operation determination section on the copied content and (ii) displays the display data on the display device,
wherein the exclusive operation determination section includes:
an operation state management section that manages (i) the new operation determined by the operation determination section and (ii) the previous operation information determined by the operation determination section; and
a determination control section that (i) determines the new exclusive operation concerning the new operation determined by the operation determination step by using the previous operation managed by the operation state management section and exclusive operation information, the exclusive operation information including at least (a) the new operation determined by the operation determination section and (b) the previous operation information determined by the operation determination section and (ii) determines whether or not the content is to be copied.

* * * * *